United States Patent

Milton et al.

[15] 3,646,828

[45] Mar. 7, 1972

[54] TRANSMISSION CONTROLS

[72] Inventors: Thomas J. Milton, Bay City; Lehman J. Connell, Frankenmuth, both of Mich.

[73] Assignee: General Motors Corporation, Detroit, Mich.

[22] Filed: Oct. 21, 1970

[21] Appl. No.: 82,746

[52] U.S. Cl. ..................................74/484, 74/473 SW
[51] Int. Cl. ..................................................G05g 9/12
[58] Field of Search..................................74/484, 473 SW, 473

[56] References Cited

UNITED STATES PATENTS 2,693,713  11/1954  Reid et al..................................74/484

Primary Examiner—Milton Kaufman
Attorney—W. E. Finken, A. M. Heiter and Charles R. White

[57] ABSTRACT

Transmission control in which shaft tube is mounted in a steering column jacket for limited axial and rotary movement. There is a radially extending drive pin which is secured to the external portion of the shift tube by a tongue and groove connection with a mount. The drive pin is selectively engageable with drive portions formed in the heads of first-reverse and second-third shift levers which extend alongside of the shift tube and are rotatably mounted by a pivot pin radially extending from a mount secured to the jacket by tongue and groove means.

5 Claims, 7 Drawing Figures

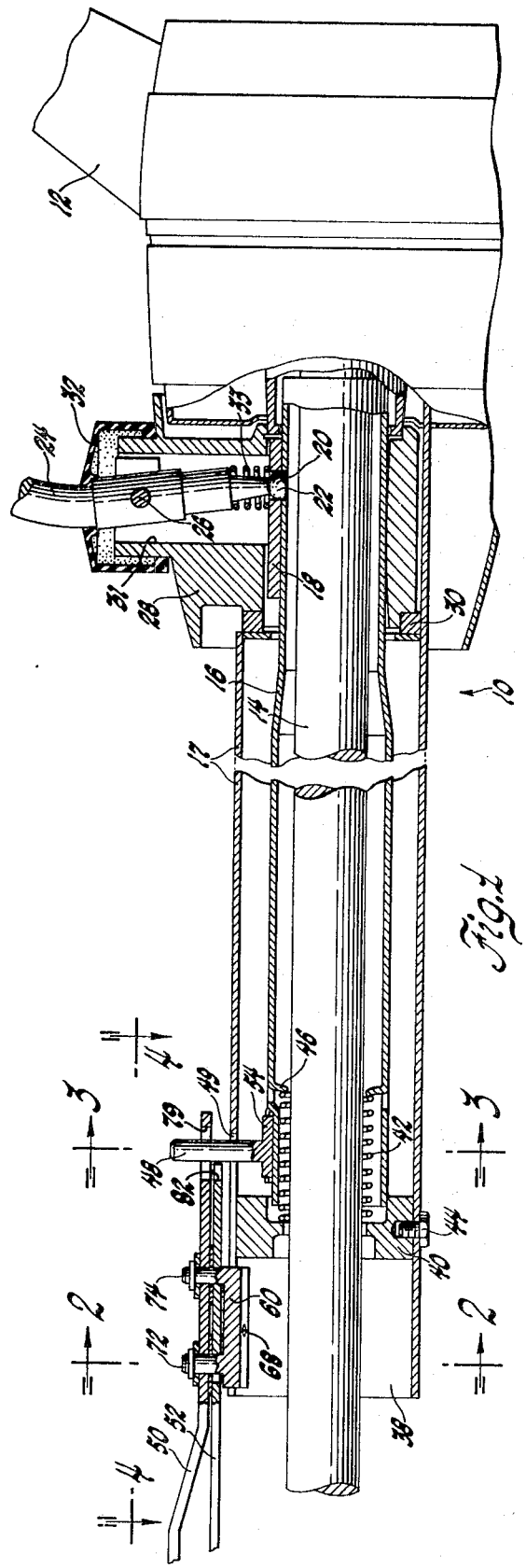

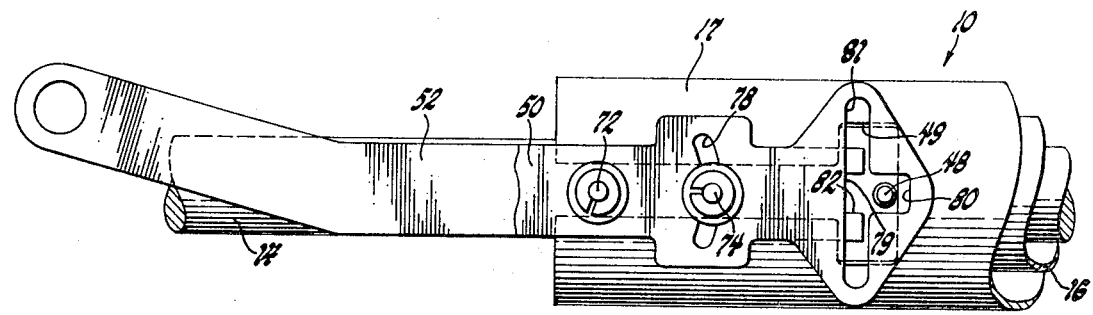
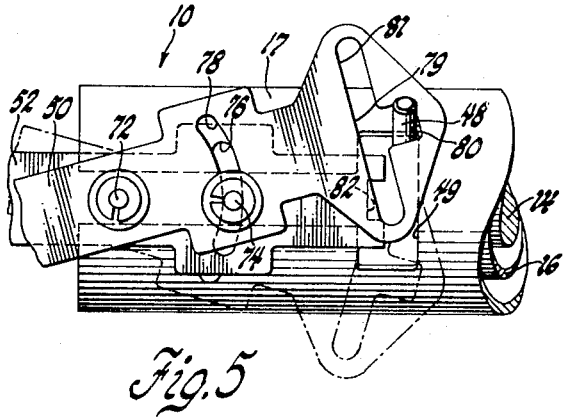
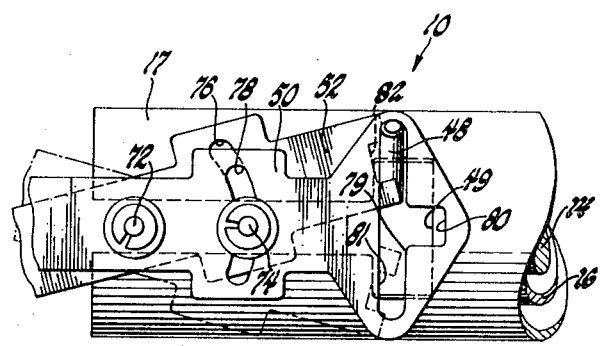
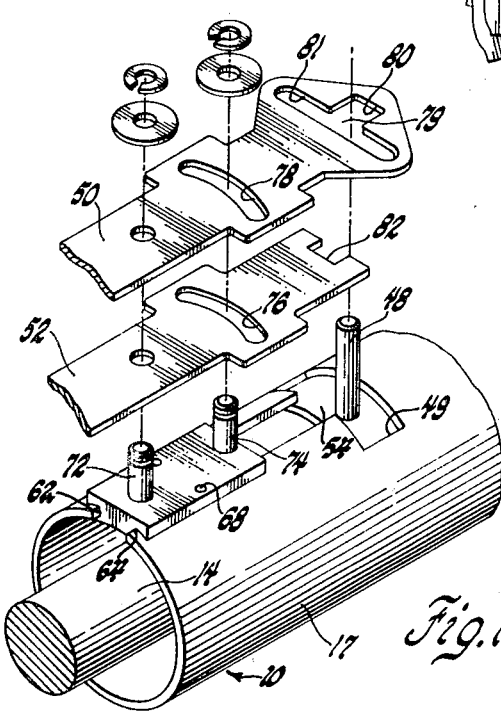

TRANSMISSION CONTROLS

This invention relates to controls and more particularly to a new and improved control for a transmission in which remote shift levers are selectively and drivingly connected to a selector member actuated by a vehicle operator.

Change speed transmissions are frequently controlled by a vehicle operator through a linkage supported by the vehicle steering column. The linkage system generally includes a manual lever mounted adjacent to the steering wheel convenient for manipulation by the operator. This manual lever is movable to actuate a shifter tube, which selectively and drivingly couples to either a first-reverse shifter lever or a second-third shifter lever extending radially from the steering column. Subsequently, rotation of the manual lever in one direction shifts the transmission into one drive range while rotation in an opposite direction shifts the transmission into another drive range. By rotating the shifter tube to a neutral position, the tube can be moved in an axial direction to drivingly couple the other shifter lever to the shifter tube. This operation in moving from one shift lever to the other is generally referred to as a crossover and the entire pattern of shifting is generally referred to as the H pattern.

In the present invention there is provided a new and improved arrangement of longitudinally extending shift levers which are mounted directly on the jacket of the steering column for limited turning movement. One shift lever is stacked on the other for limited rotation with respect to a common pivot extending from a new and improved mount which preferably is slidably fitted into a slot provided in the end of the jacket. The mount may be secured in position on the jacket by breakaway fasteners if desired. The shift levers lay alongside the steering column and extend generally longitudinally with the jacket instead of radially.

This invention also features a new and improved drive mechanism for selectively and drivingly connecting the shift tube with any one of the shift levers. This mechanism preferably includes a drive pin which extends radially outwardly from a drive pin mount secured to the shift tube. In a preferred embodiment the mount has a curved base with opposite sides having grooves therein which receive inwardly extending, retaining flanges struck from the shift tube. The drive pin extends radially through an opening in the jacket and is selectively engageable with drive recesses formed in the shift levers.

Normally, the shift tube and the attached drive pin are biased by a spring mechanism in one direction so that the selector pin engages a drive recess in one of the selector levers. When the levers are in a neutral position, a crossover can be accomplished by moving the shift tube axially so that the selector pin will engage a drive recess in the other shift lever to provide for actuation of that selector lever without movement of the first selector lever.

These and other features and objects of this invention will be more apparent from the following detailed description and drawings in which:

FIG. 1 is a view of a gearshift control mechanism within a steering column with parts broken away and in section to show details of the invention.

FIG. 2 is a view along lines 2—2 of FIG. 1.

FIG. 3 is a view along lines 3—3 of FIG. 1.

FIG. 4 is a view along lines 4—4 of FIG. 1.

FIGS. 5 and 6 are views similar to FIG. 4 illustrating operation of the invention.

FIG. 7 is an exploded view showing the shift levers and shift lever mounting.

In FIG. 1 there is a vehicle steering column 10 in a vehicle having mounted at its upper end a steering wheel 12 that is drivingly secured to a steering shaft 14. A shifter tube 16, supported within the jacket 17 of the steering column, surrounds the steering shaft and has a curved plate 18 fastened thereto. This plate and an adjacent portion of shifter tube 16 are formed with an opening 20 for the reception of the ball end 22 of a manual lever 24. The manual lever is pivoted by a pivot pin 26 to a lever housing 28 supported for limited rotation on the steering column 10. As shown, the lever housing surrounds the shifter tube and is rotatably mounted on a bushing 30 secured in the column 10. The manual lever 24 extends through an opening 31 formed in the lever housing which has sufficient dimensions to permit the lever 24 to be rocked on the pivot pin 26 and has a width which is slightly larger than the enlarged portion of the manual lever near the pivot pin so that the lever 24, housing 28 and tube 16 can be turned as a unit in either direction with respect to the longitudinal axis of the steering column 10. A coil spring 33 is loaded between the plate 18 and the lever 24 to take up any play. A suitable flexible cover 32 is provided for the lever housing 28 to seal the opening 31 and to provide a finished appearance. By the mechanism described above, the shifter tube can be moved axially by the pivoting of lever 24 on pivot pin 26 or turned in either direction on its axis by turning of the manual lever and housing 28 in an appropriate direction.

The shifter tube 16 extends almost to the lower end of the steering column jacket 17 which is formed with an open end 38 which receives a disclike support 40 that provides a seat for a coil spring 42 that extends inside of the shift tube 16. The spring support 40 is fixed to the jacket 17 by screws 44. The upper coil spring 42 contacts an inwardly extending flange portion 46 struck from the shift tube 16 so that the spring normally urges the shift tube 16 to an upper limit.

A drive pin 48 is affixed to the end of the shift tube and extends radially through an opening 49 in the jacket. This pin is utilized to drivingly engage either one of the longitudinally extending shift levers 50, 52 supported for limited turning movement on the steering column. The levers are drivingly connected to the shift arms of a transmission such as disclosed in U.S. Pat. No. 3,025,714 to C. M. Bliss. Lever 52 preferably controls the first-reverse gearing in the transmission while lever 50 controls the second-third gearing. As shown, the drive pin 48 projects from a capsule-type mount having an arcuate base portion 54 having tracklike slots along either side which receive inwardly facing flanges 56 struck from the shift tube.

The drive pin and its base portion 54 may be retained in position with suitable breakaway-type pins 58 if desired. Levers 50 and 52 are mounted for limited rotation on a shift lever mount 60 which has grooves 62 formed in opposite sides thereof which receive the straight-edged tongue portions 64 of the jacket 17 formed by extending opening 49 to the lower end of the jacket as shown best in FIGS. 2 and 7. The shift lever mount can be easily inserted into the opening provided and secured in position by breakaway pins 68 that project into suitable openings formed in the jacket. The shift lever mount has an upstanding pivot 72 which extends through pivot openings formed in both of the shift levers. A suitable washer and a snap ring are utilized to hold the shift levers on the shift lever mount. As best shown in FIGS. 1, 4 and 7, the shift lever mount 60 has a second, upstanding projection 74 which extends through arcuate guide slots 76 and 78 in the shift levers 50 and 52 respectively. A suitable washer and snap ring are used to retain the pin in the slots 76 and 78.

FIG. 4 shows the drive pin 48 in a neutral position and located within the confines of a T-shaped opening 79, formed in a head portion of lever 50. The T-shaped opening has a slot portion 81 which extends laterally in the head and has a connecting, longitudinally extending drive notch 80. The drive notch 80 is adapted to receive the pin 48 so that the shift tube can turn the lever 50. If the operator turns the manual lever 24 in one direction, the pin 48 will engage one of the sidewalls forming drive notch 80 to turn the shift lever on pivot pin 72 as shown in FIG. 5 to select a predetermined gear ratio, for example, second gear. By turning the manual lever and shift tube in an opposite direction, the pin will engage the opposite sidewall of drive notch 80 to turn lever 50 in an opposite direction to select third gear.

If the levers 50 and 52 are in the neutral position shown in FIG. 4, a crossover can be made by turning the manual lever on pivot pin 26 to move the shift tube axially downwardly.

When this occurs the pin engages a drive notch 82 formed in the head of first reverse shift lever 52 which is longitudinally spaced from the drive notch 80. The laterally extending slot portion of the T-shaped opening is coplanar with drive notch 82 to accommodate movement of the drive pin when lever 52 is being actuated. With this lever drivingly connected to the shift tube, first or reverse gear can be selected by appropriately turning the shift tube to rotate shifter lever 52 clockwise or counterclockwise as best shown by FIG. 6.

From the above it will be appreciated that a compact assembly of remote shift levers is provided. The assembly and disassembly of these levers is enhanced by the utilization of the capsule-type mounts for the lever support and the drive pin. In the event that the control is to be utilized with an automatic transmission, the invention can be modified for that purpose by removing one of the levers from the system and using the remaining lever.

While preferred embodiment of this invention has been shown and described, other embodiments are now readily apparent. Thus, this invention is not to be limited to the construction shown and described but by the claims which follow:

What is claimed is:

1. A control for a change speed transmission comprising a fixed support, a shift tube movably mounted by said support for limited longitudinal and rotary movement, yieldable means mounted on said support and engaging said shift tube for biasing said shift tube to a predetermined position, pivot means projecting outwardly from said support, longitudinally extending shift lever means mounted on said pivot means for limited turning movement on said support for controlling a transmission, said shift lever means having a head portion, drive means carried by an end portion of said shift tube and extending outwardly therefrom, said drive means being selectively engageable with said head portion to drivingly connect said shift tube to said shift lever means so that limited rotary movement of said shift tube will turn said shift lever means with respect to said pivot means to effect ratio change in the transmission.

2. A transmission control comprising a longitudinally extending support member, an actuator mounted for limited longitudinal and turning movement with respect to said support member, a drive pin extending outwardly from said actuator, a base member supporting said drive pin on said actuator, a pair of shift levers extending longitudinally with said support member, a mount for said shift levers having a base member removably secured to said support member, said mount having a pivot extending outwardly from said support member for said shift levers, said levers having head portions with drive notches therein for receiving said drive pin, said drive notches being longitudinally spaced from each other so that said drive pin can be moved by said actuator to engage one of said notches to effect the turning of a selected one of said levers in response to predetermined rotation of said actuator.

3. The transmission control of claim 2 wherein said base members have groove means on the opposite sides thereof which receive tongue means extending from said actuator and said support member respectively, and said head portion of one of said shift levers having a laterally extending slot communicating with said drive notch therein to receive said drive pin and accommodate the movement of the other of said shift levers.

4. In a transmission control having a steering column with a cylindrical mast jacket, a shift tube supported for limited axial and rotary movement in said mast jacket, spring means for biasing said shift tube to a predetermined position, lever means for moving said shift tube axially in said jacket and for turning said shift tube in either direction, a drive pin extending radially from said shift tube through an opening in said mast jacket, retainer means for fixedly securing said drive pin to said shift tube, a pair of remote shift levers extending in the same general direction as said jacket, support means secured to said jacket having a radially extending pivot, means for mounting said remote shift levers on said pivot, each of said shift levers having a head portion with a drive notch therein, said drive notches being longitudinally spaced from each other so that said drive pin can engage only one notch at a time, and control means for moving said shift tube and said pin from one of said notches into engagement with the other of said notches so that a selected one of said shift levers can be turned in response to the turning of said shift tube.

5. In a transmission control, a steering column jacket, a transmission control tube disposed within said jacket and mounted for limited longitudinal and rotary movement therein, manual lever means operatively connected to said control tube, spring means disposed within said jacket and extending within said control tube for exerting a force thereon to urge said tube to a predetermined position, a spring seat for said spring means disposed within said jacket and secured therein, a drive pin having a mounting block secured to an external portion of said control tube, said drive pin projecting radially therefrom, an opening in said jacket for the passage of said drive pin therethrough, a pair of shift levers for controlling a transmission which extends alongside of said jacket, a mounting block for said control levers securely fixed to said jacket, said block having a radially disposed pivot pin projecting therefrom, said shift levers being operatively pivoted on said pivot pin and having an arcuate guide slot therein, a guide pin extending radially from said jacket and extending through said arcuate slots formed in said shift levers, each of said shift levers having a head portion with a drive notch therein for the reception of said drive pin, one of said levers having a laterally extending opening in said head portion thereof communicating with the drive notch therein to receive said drive pin, said notches being longitudinally displaced from each other and being aligned when said levers are in a neutral position, said drive pin being normally engaged with one of said notches and being movable in response to axial movement of said control tube by operation of said manual lever against the opposing force of said spring means into said other notch and into said laterally extending opening to permit one of said shift levers to be moved without the movement of the other of said shift levers.

* * * * *